INVENTORS
ROBERT W. BRUNDAGE
WILLIAM J. WAIGHT
BY *Meyer, Tilberry & Body*
ATTORNEYS

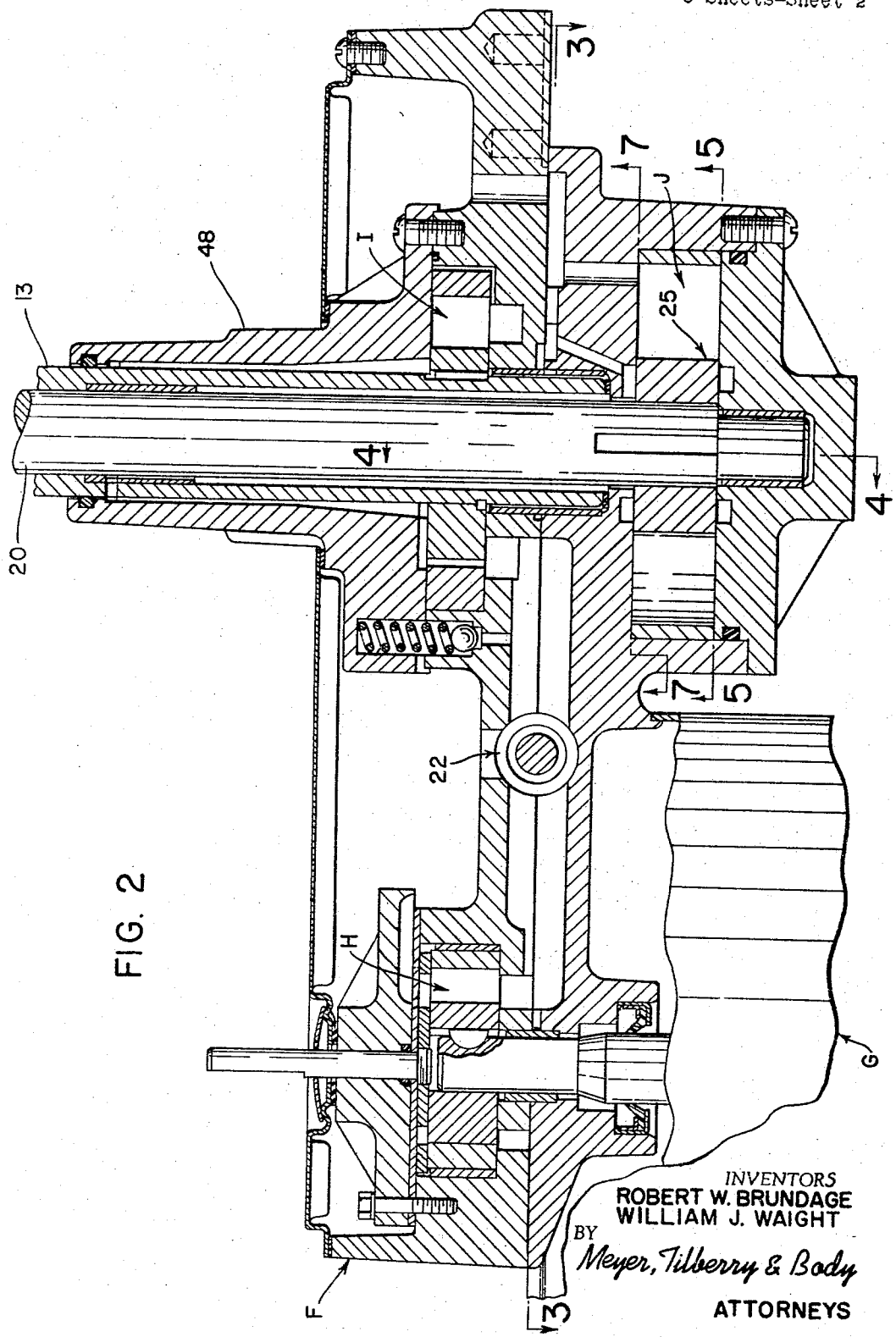

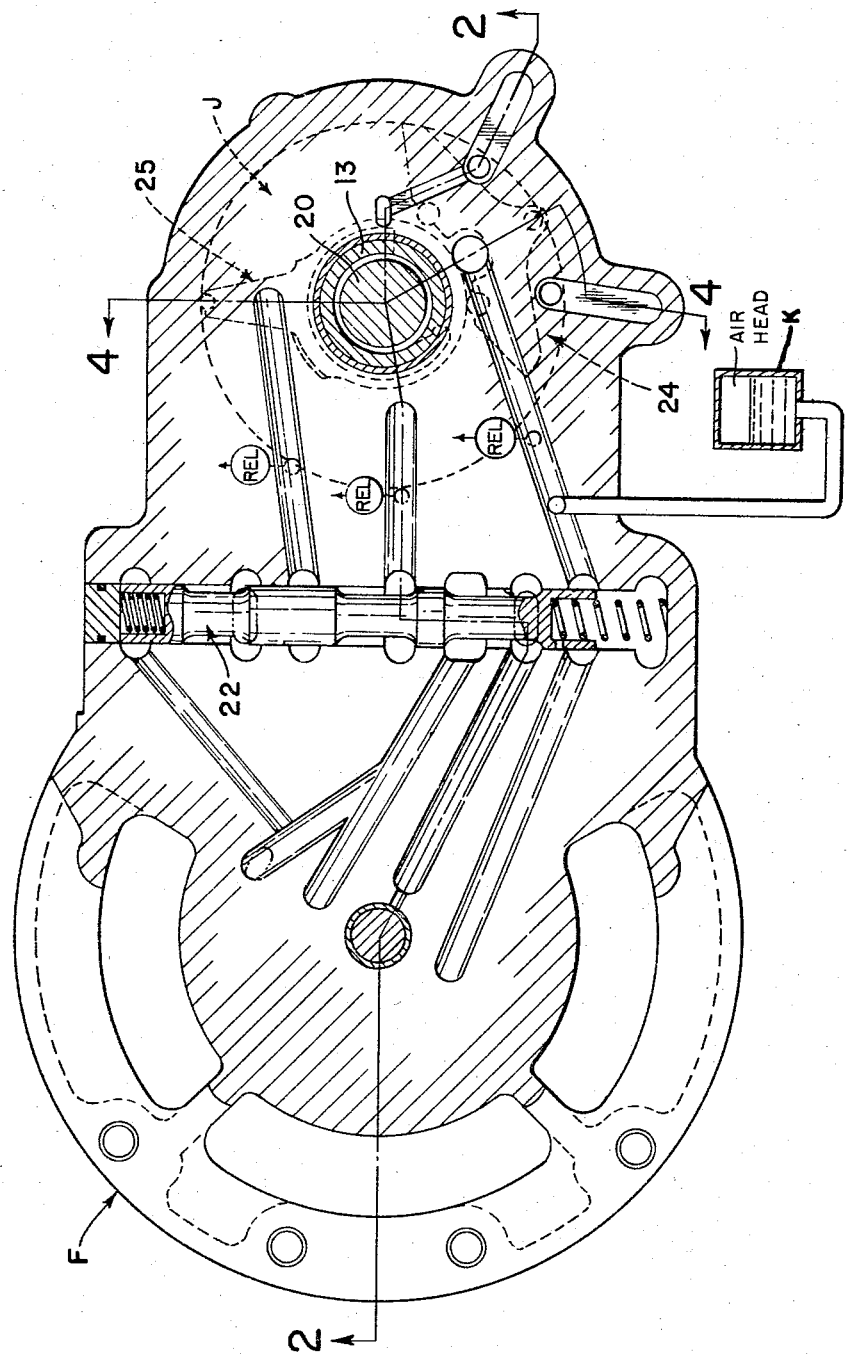

April 25, 1967 R. W. BRUNDAGE ETAL 3,315,500
OSCILLATING POWER SOURCE PARTICULARLY FOR LAUNDRY MACHINE
Filed March 9, 1966 5 Sheets-Sheet 4

INVENTORS
ROBERT W. BRUNDAGE
WILLIAM J. WAIGHT
BY
*Meyer, Tilberry & Body*
ATTORNEYS

United States Patent Office 3,315,500
Patented Apr. 25, 1967

3,315,500
OSCILLATING POWER SOURCE PARTICULARLY FOR LAUNDRY MACHINE
Robert W. Brundage, Belnor, St. Louis, and William J. Waight, Florissant, St. Louis, Mo., assignors to The Emerson Electric Mfg. Co., St. Louis, Mo., a corporation of Missouri
Filed Mar. 9, 1966, Ser. No. 533,086
7 Claims. (Cl. 68—133)

This application is a continuation-in-part of our copending application, Ser. No. 308,850, filed Sept. 13, 1963 and is related to the copending application of Robert W. Brundage, one of the joint inventors herein, Ser. No. 303,905, filed Aug. 23, 1964 now Patent No. 3,242,703.

This invention pertains to the art of power sources and more particularly to an oscillating power source having an improved plot of speed relative to time.

The invention is particularly applicable to the art of agitating type laundry machines and will be described with particular reference thereto although it will be appreciated that the invention has other and broader applications.

In the art of laundry machines, it is conventional to provide an agitator which either reciprocates on a line of movement or oscillates about an axis of rotation. Such agitators are usually powered by an electric motor mechanically coupled to the agitator through a speed reducing and motion translating mechanism which changes the rotation of the motor to the motion and frequency desired. In such laundry machines, the effectiveness of the washing action is a non-linear function of the instantaneous speed of movement of the agitator and it would thus appear that for best washing action, the speed should be kept high. However, there is also an instantaneous speed above which tangling and knotting of the clothes becomes so severe as to be totally unacceptable to the user. Therefore in the past, it has been necessary to reach a compromise between washing action and knotting by limiting the maximum instantaneous speed of the agitator.

Heretofore the mechanism for translating the rotation of the motor to oscillatory or reciprocatory movement has usually been comprised of a crank which oscillates a crank arm and the movement of this crank arm is then transferred to the agitator.

A plot of the speed of the agitator against time driven by such a transmission is substantially sinusoidal in form, that is to say the agitator moving at a maximum speed in one direction commences to slow down at a gradual but increasing rate then reverses itself and approaches the maximum speed in the opposite direction at a gradually decreasing rate. With such a sinusoidal speed variation, it will be appreciated that the instantaneous speed in either direction is a maximum only for an instant before the slowing down commences. In other words, the instantaneous speed is large for only a small portion of each cycle. It is this maximum speed, however, that determines the knotting action. Because the speed is only a maximum for a small portion of each cycle and because the washing action is a function of the instantaneous speed, the total amount of washing action in each cycle is relatively small and it may be said that the washing action, while the best obtainable, is inefficient in relation to the length of a cycle.

Stated otherwise, the amount of energy transferred to the clothes is a function of the area under the speed-time curve which as will appear is relatively small for a sinusoidal curve compared to the area under a square wave curve of the same maximum velocity such as is obtainable using the present invention.

Various means have been employed in the past to improve the washing action such as by varying the agitator design, changing the length of its stroke or rotation in any one direction or changing the number of reciprocation or oscillations per minute or by using various highly complicated forms of mechanical motion translating apparatus to give a particular desired form of the plot of speed against time for the agitator.

None of these prior mechanisms, however, have ever appreciated the improved results which can be obtained from a speed-time variation which plots generally into the form of a square wave or modifications or variations of a square wave, that is to say where the speed at the beginning and end of each half cycle increases and decreases at a rate substantially in excess of a sine wave and then for the intermediate parts of each half cycle is generally constant.

Thus, in accordance with the invention, apparatus for laundering clothes is provided wherein the velocity of the agitator varies with respect to time such that at least one half of the peak agitator velocity is obtained in the first $\frac{1}{15}$ of the time of each half cycle. Stated otherwise, the acceleration of the agitator at the beginning of each half cycle is at least 1½ times that of the acceleration when the agitator velocity varies sinusoidally.

The term sinusoidal velocity is used herein to mean a sine wave form such as would be provided by a plot of velocity of a crosshead driven by a crank rotating at constant velocity. The term sinusoidal acceleration is used herein to mean a sine wave form such as would be provided by a plot of acceleration imparted to a crosshead by a simple crank rotating at constant velocity, that is a simple conversion of uniform rotary motion to linear oscillatory motion. The acceleration is, of course, the derivative of the velocity.

While the effectiveness of the apparatus of this invention is a function of the acceleration of the agitator and some of the following discussions will be in terms of acceleration, it is sometimes easier to define or to establish the conditions obtaining at a particular moment in terms of velocity.

The obtainment of one half of the peak agitator velocity in the first $\frac{1}{15}$ of the time of each half cycle is about equivalent to an acceleration of 1½ times that of sinusoidal acceleration. The term cycle is used herein to mean the time period from the instant of beginning of rotation of the agitator in the same direction again. The term half cycle is used to mean the time period from the instant of beginning of rotation of the agitator in one direction to the instant of beginning of rotation of the agitator in the other direction.

Further in accordance with the invention, apparatus for laundering clothes is provided wherein the agitator is accelerated at the beginning of each cycle at a rate at least 1½ times that of sinusoidal acceleration to a velocity in excess of the desired maximum is then reduced to a generally constant velocity for substantially the remainder of the half cycle.

Further in accordance with the invention, apparatus is provided for driving an agitator comprised of a reversible hydraulic motor mechanically connected to the agitator, a substantially constant speed electric motor driving a positive displacement hydraulic pump, the output of which is connected to a positive displacement hydraulic motor through what may be termed a quick-acting reversing valve, such as a snap-acting valve so that theoretically its direction of rotation reverses in as short a time as is possible. With a snap-acting valve, the reversal takes place substantially instantaneously and the plot of speed of the motor against time is substantially a square wave, or more accurately, a trapezoidal wave.

The hydraulic motor may be a reciprocating piston, an external gear type motor, an internal gear type motor, or a vane type motor, the important thing being that it is a positive displacement type motor. This is also true of the pump.

Such a motor driven by a constant-speed, constant-displacement hydraulic pump inherently has a constant speed independent of load, discounting, of course, internal leakage of the pump and motor with increases in load.

If the fluid flow to such a hydraulic motor is reversed substantially instantaneously, the plot of speed relative to time will be substantially a square wave. A perfect square wave is impossible to obtain due to the time required for the valving action to take place and the inherent inertia of the moving parts.

By substantially a square wave as used in this specification and claims is meant a plot of agitator speed against time wherein at least one half of the peak agitator velocity is obtained in the first $\frac{1}{15}$ of the time of each half cycle. This may be compared to a sine wave where one half of the peak velocity is reached in approximately $\frac{1}{5}$ to $\frac{1}{6}$ of a half cycle. A square wave implies infinite acceleration. Substantially a square wave implies very high acceleration and as used herein substantially square wave acceleration is at least 1½ times that of sinusoidal acceleration.

Substantially a square wave acceleration often imposes forces on the parts of the machine which are too high for the mechanical strength of the part and in accordance with a more limited aspect of the invention, the motor is reversed as rapidly as is possible and means are provided for limiting the acceleration of the agitator to values which the mechanical strength of the parts can withstand. Such means in accordance with the invention may include means for bypassing some of the motor inlet fluid, when it reaches excessive pressures, back to the pump or, and more preferably, accumulator means which will absorb some of the energy of acceleration and then deliver it back to the system when the acceleration drops below a value which the mechanical parts can withstand. Such accumulator means may include a hydraulic accumulator in the input to the hydraulic motor or mechanical accumulator means associated with the motor mounting or interposed between the motor and the agitator member. These mechanical accumulator means may take a number of different forms but are usually elastic members such as metal or rubber springs. The use of such accumulators modifies the wave shape by lowering the initial acceleration but increasing the peak velocity above that of the driving motor.

The principal object of the invention is the provision of a new and improved apparatus for washing clothes wherein the variations in speed and acceleration of the agitator plotted against time are such as to provide maximum washing action of the clothes with minimum knotting thereof.

Another object of the invention is the provision of a new and improved apparatus for washing clothes which gives a maximum conversion of energy input to useful work output.

Another object of the invention is the provision of a new and improved apparatus for washing clothes using an agitator wherein the speed rises rapidly to a maximum then decreases to a generally constant velocity and then reverses.

Another object of the invention is the provision of a new and improved arrangement for laundering clothes wherein the velocity of the agitator plotted against time is substantially a square wave.

Another object of the invention is the provision of a new and improved mechanism for driving the agitator of a laundry machine wherein means are provided for limiting the acceleration forces applied to the agitator by absorbing some of the energy of acceleration and then subsequently delivering it to the agitator.

The invention may take physical form in certain parts and arrangement of parts a preferred embodiment of which will be described in detail in this specification and illustrated in the accompanied drawings which are a part hereof and wherein:

FIGURE 2 is a cross-sectional view of FIGURE 3 taken approximately on the line 2—2 thereof showing in detail the power transmission for the laundry machine of FIGURE 1;

FIGURE 3 is a cross-sectional view of FIGURES 1 and 2 taken approximately on the line 3—3 thereof;

Figure 1:
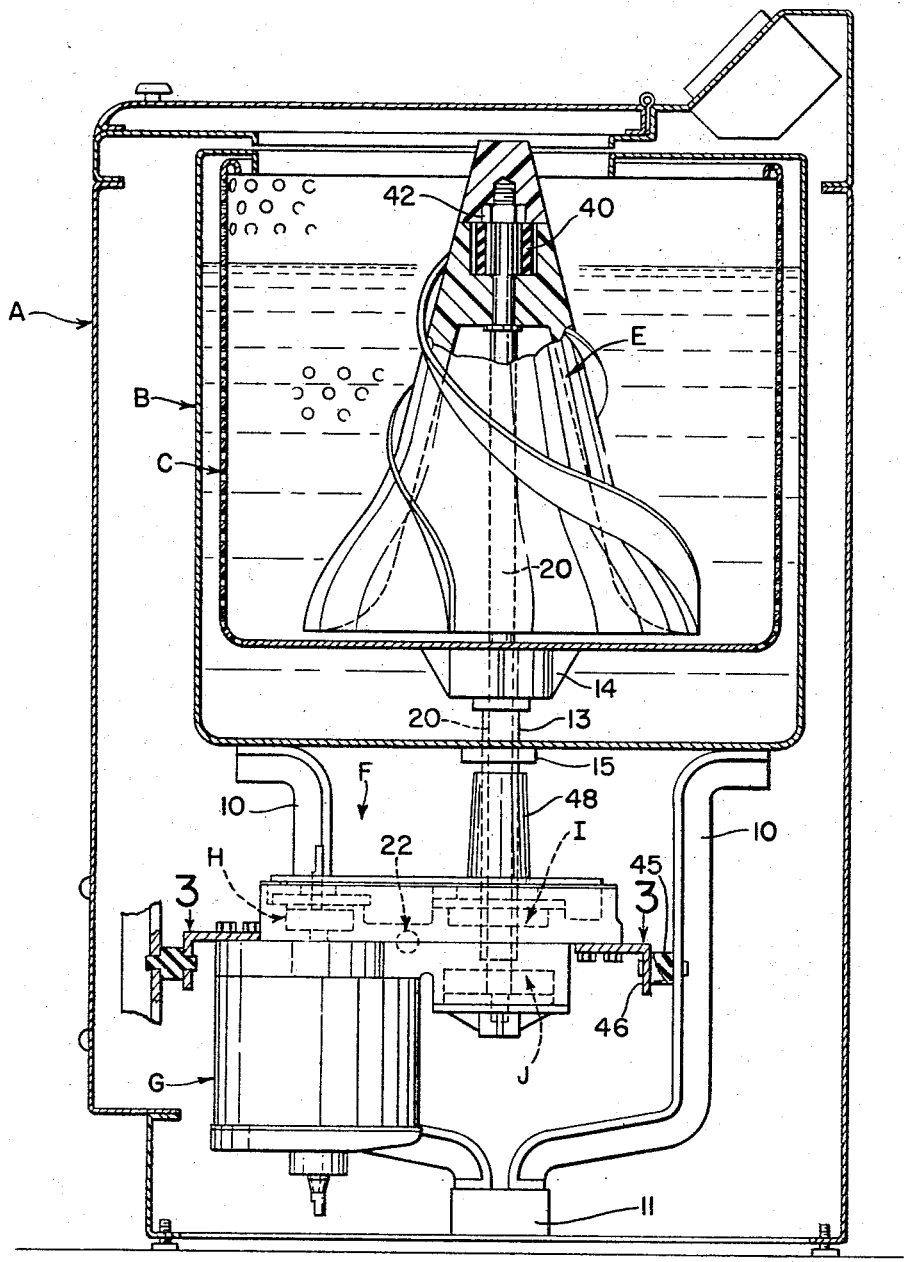
FIGURE 1 is a partial cross-sectional view of a machine illustrating a preferred embodiment of the invention.
Figure 5:
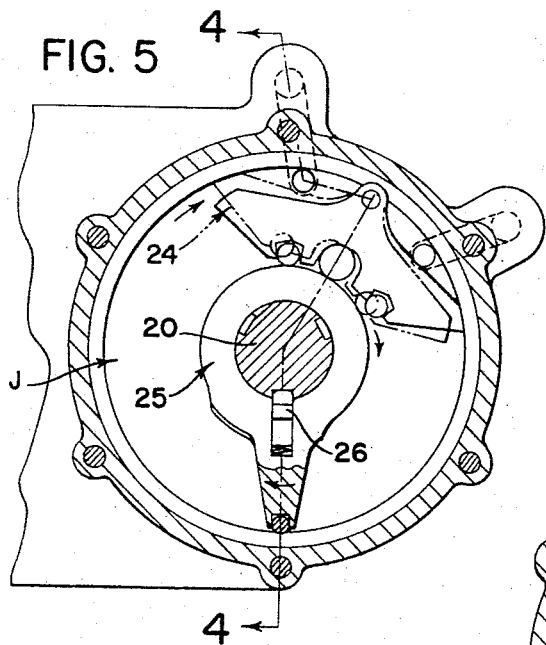
FIGURES 5 and 6 are detail views showing the oscillating type motor; taken on line 5—5 of FIGURE 2.
Figure 6:
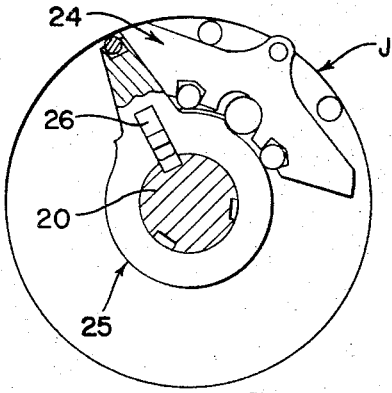
Figure 7:
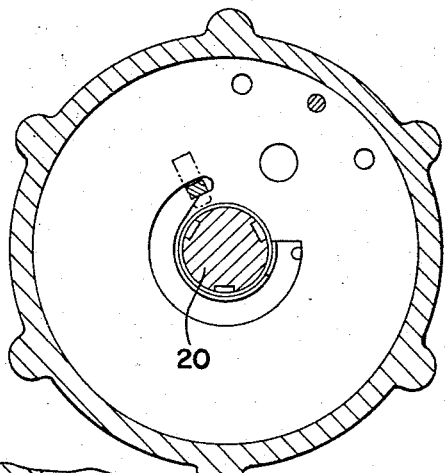
FIGURE 7 is a further detail showing how the vane motor is disconnected from the agitator drive shaft taken on line 7—7 of FIGURE 2.
Figure 4:
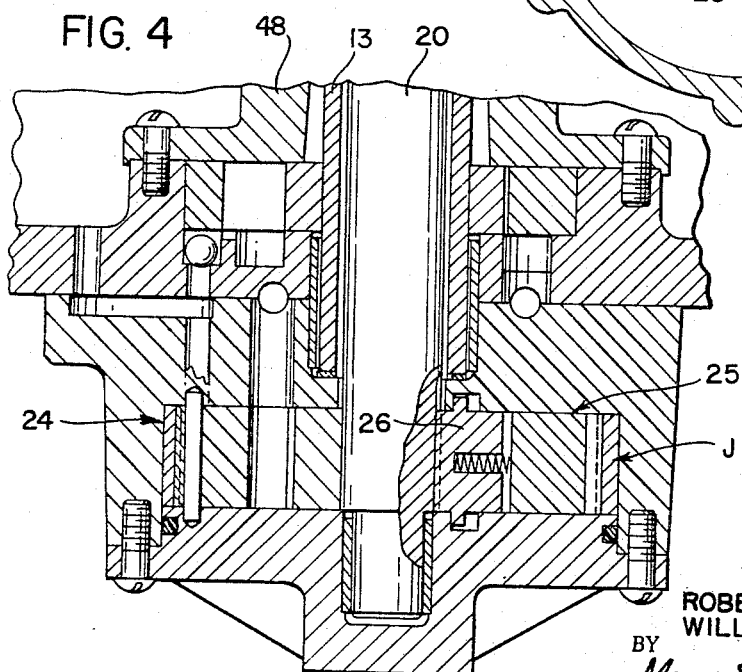
FIGURE 4 is a fragmentary cross-sectional view of FIGURES 2, 3 and 5 taken approximately on the line 4—4 thereof.

Referring now to the drawings, wherein the showings are for the purposes of illustrating a preferred embodiment of the invention only and not for the purposes of limiting same, FIGURE 1 shows somewhat schematically a typical laundry machine comprised of an outer housing A, a tub B adapted to hold the laundry water, a perforated basket C concentrically arranged in the tub and adapted to hold the clothes to be washed and be periodically spun for the purpose of centrifuging water out of clothing, and an agitator member E concentrically arranged within the basket and adapted to be oscillated and agitate the clothes within the basket C.

Positioned immediately below the tub A is a hydraulic transmission F comprised generally of an electric motor G driving a hydraulic pump H, a hydraulic spin motor I mechanically coupled to the basket and adapted to spin same when supplied with hydraulic fluid, and a hydraulic agitator motor J mechanically coupled to the agitator and adapted to oscillate same when supplied with hydraulic fluid.

The housing A forms no part of the present invention and is shown relatively schematically.

The tub B likewise forms no part of the present invention and is mounted within the housing A by means of a plurality of legs 10 fastened to the underside thereof and extending downwardly to a mounting member 11 so arranged that when the basket C is being spun, the entire tub B, basket C, and transmission F may move horizontally slightly to absorb the unbalanced forces created by the centrifugal force due to unequal distribution of the clothes within the basket C. Again, the relationship between the legs 10 and the mounting 11 forms no part of the present invention and is only shown schematically.

The basket C also forms no part of the present invention and is supported for rotation on the upper end of a hollow shaft 13 by means of a suitable mounting bracket 14 which shaft 13 extends downwardly through a water seal bearing 15 in the lower surface of the tub B into driving engagement with the hydraulic spin motor I in the transmission F.

The agitator member E is conventional in construction and is supported for oscillation about a vertical axis coincident with the axis of spin of the basket C on the upper end of a shaft 20 which shaft 20 extends downwardly through the hollow shaft 13 into driving engagement with the hydraulic agitator motor J. The particular arrangement for mounting the agitator E on the upper end of the shaft 20 is in accordance with the invention and will be described in greater detail hereinafter.

The hydraulic transmission F in its particular construction forms no part of the present invention except insofar as the characteristic of the speed versus time variation of the agitator motor are particularly adapted to carry out the present invention. For a detailed description of the construction and the mode of operation of the hydraulic transmission F, reference is made to the copending application of Robert Brundage, one of the applicants herein, Ser. No. 303,905, filed Aug. 22, 1963, now Patent No. 3,242,703, the entire disclosure of which is incorporated herein by reference.

Suffice it to say that the electric motor G has a substantially constant speed. In the preferred embodiment, this motor is a four-pole, sixty-cycle, split-phase motor which has a synchronous speed of 1800 r.p.m., a no load speed of approximately 1785 r.p.m. and a full load speed of approximately 1725 r.p.m. or a 4.0% variation from no load to full load.

The hydraulic pump H is a multiple chamber type of pump having a volume output, neglecting internal leakage as the pressures increase, directly proportional to its speed of rotation. As the motor speed is substantially constant and the internal leakage is negligible, the volume output of the pump regardless of pressure is substantially constant.

The hydraulic fluid output of the pump H flows through a flow directing valve 22 and then through a flow reversing valve member 24 to the hydraulic agitator motor J. In the embodiment shown, this valve 24 forms a part of this motor J as will appear hereinafter and as is described in said copending application of Brundage.

Hydraulic motors having a substantially constant volume of fluid being supplied thereto, and neglecting internal leakage due to variations in loads, have a substantially constant speed. While the hydraulic agitator motor J may take any one of a number of different forms in the embodiment shown, the agitator motor J includes a vane piston 25 keyed to the shaft 20 by key 26. This piston 25 has a maximum arc of rotation on the order of 300° and as the vane piston 25 is directly connected to the agitator E, the maximum arc of movement of the agitator E will likewise be 300°. If other types of hydraulic motors are employed such as an internal gear type motor, this arc can be increased or decreased as desired.

The reversing valve 24 in accordance with the invention is of a type which requires the minimum amount of time to shift from one position to the other. Such valve may take a number of different forms but in the embodiment of the invention shown is in the form of a flapper member pivotably positioned within the same cavity as the vane piston 25 and subjected to the same hydraulic pressures as is the vane piston 25. The member 24 is unbalanced hydraulically and the hydraulic pressures are employed to shift the member 24 from one position to the other. Its operation is fully described in the said copending application of Brundage. This important thing is that this valve member 24 shifts freely from one position to the other and thus substantially instantaneously.

With such a quick-acting valve and because the speed of movement of the vane must be substantially constant, it will be appreciated that the direction of rotation of the vane piston 25 being supplied with a substantially constant volume of hydraulic fluid will reverse its direction of rotation within the time period of shifting the value that is to say substantially instantaneously. A plot of the speed of rotation of the vane piston relative to time would also be substantially a square wave. Stated otherwise, the speed of rotation in either direction plots as a horizontal line and the change of speed plots as substantially a vertical line. This is to be distinguished from the plot of speed versus time for conventional mechanical transmission which is essentially a sinusoidal wave.

While laundry machines patented heretofore have used vane type hydraulic motors to operate the agitator, it is believed that we are the first to ever appreciate the advantages to be obtained from using a substantially constant volume pump regardless of pressure and of operating the agitator such that its speed of rotation plotted against time approaches or is substantially a square wave.

The shaft 20, the agitator E, the clothes being rotated by the agitator E, and the water all have substantial amounts of inertia, that is to say they resist any changes in the direction of rotation in amounts directly proportional to their mass and the attempted acceleration thereof. When the speed versus time is substantially a square wave, the acceleration is substantially infinite and can be sufficiently large that the resultant forces impose stresses on the parts connecting the vane piston 25 to the agitator sufficient to cause early failure of the parts or the hydraulic pressures at the inlet of the motor J can reach excessive values. These high rates of acceleration require substantial amounts of energy to be supplied to the agitator motor J for brief periods of time which large amounts of energy are reflected in relatively high hydraulic pressures at the input of the motor and high torsional forces in the transmission mounting or agitator drive shaft.

In accordance with the present invention, means are provided for either limiting the amount of energy supplied to the agitator motor J and limiting the rate of acceleration or in absorbing and storing some of such energy momentarily and then delivering it back to the system or both.

To prevent excessive pressures from developing, a pressure relief valve as is described in the said copending application of Brundage is provided to communicate the inlet passage to the motor J through the sump when the pressures reach excessive values. The energy in any hydraulic fluid passing through this pressure relief valve, however, is dissipated and the only effect is to make the speed-time curve from one direction of rotation to the other slightly less steep.

Additionally and more preferably in accordance with the invention, means are provided for accumulating this energy and then delivering it to the agitator E. Such accumulation may be done by means of a hydraulic accumulator K communicated with the input to the agitator motor J such that when the pressures rise to excessive values, fluid will flow to the accumulator and compress air or a spring therein and will then be redelivered to the motor J when the pressures subsequently drop, or, and more preferably, elastic means are provided either between the vane piston 25 and the agitator E or between the transmission F and its support or, and preferably, both.

The elastic means between the vane piston 25 and the agitator E may take a number of different forms such as making the shaft 20 a torsion bar, by providing an elastic connection between the shaft 20 and the vane piston 25 but in accordance with the preferred embodiment, the upper end of the shaft 20 is splined and over this spline is fitted a rubber sleeve 40 having mating splines on its inner surface and splines on its outer surface which mate with corresponding splined surfaces on the inside of the agitator E adjacent its upper end. This rubber sleeve is elastic and when the vane motor J reverses, absorbs some of the energy of the motor limiting the acceleration of the agitator E and then when the acceleration of the agitator E drops, delivering this energy back to the agitator E as will appear hereinafter. Obviously the rubber could be bonded to the shaft and agitator or in the form of a bushing midway of the length of the shaft 20. A nut 42 threaded on the upper end of the shaft 20 holds the part in assembled relationship.

Further in accordance with the preferred embodiments of the invention, the transmission F is mounted relative to the supporting legs 10 by means of rubber blocks 45 positioned between a bracket 46 fastened to the housing of the transmission F and the vertical surfaces of the legs 10. Thus, when the motor J reverses, the entire transmission can rotate slightly relative to the legs 10 about the axis of the shaft 11 due to the elasticity of the rubber blocks 45 and when the acceleration of the agitator decreases, this energy is redelivered to the transmission which in turn is transmitted through the parts thereof to the agitator E. Alternatively the transmission F may be supported relative to the tub A by means of a rubber bushing between the transmission housing column 48 and the bushing 15.

Figure 8:
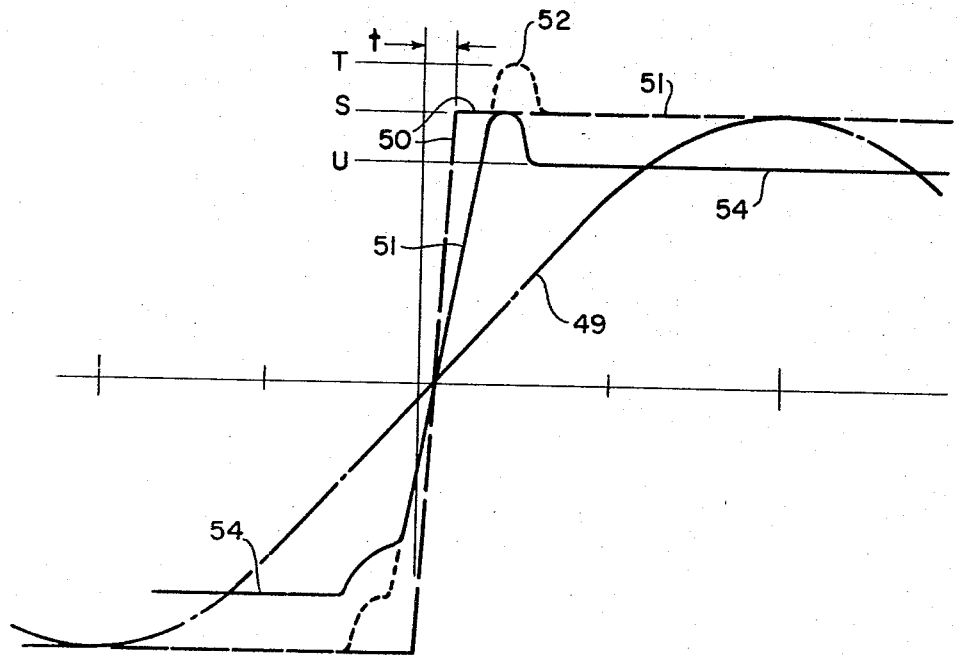
FIGURE 8 is a graph not to scale showing the agitator speeds plotted against time obtainable using the present invention compared with a sinusoidal wave shape.

FIGURE 8 shows plots of speed versus time for comparison purposes. Curve 49 shows a typical sinusoidal wave form obtainable using the conventional crank type mechanism for translating rotary motion to oscillating motion with a maximum instantaneous speed S. Curve 50 is substantially a square wave and shows the speeds of the vane piston absent a load thereon. The time $t$ for the speeds to reverse is that required for the valve member 24 to shift. Curve 51 is also substantially a square wave and shows the speeds of both the vane piston 25 and the agitator E possible when only a pressure relief valve is used in the inlet to the agitator motor J for the purpose of dissipating energy and limiting the rate of acceleration. It is to be noted that maximum speed is reached in about $\frac{1}{20}$ of the time required for a half cycle and then remains constant for the remainder of the half cycle until the direction of rotation is again reversed.

Curve 52 illustrates the momentary increase in maximum speed of the agitator obtainable using energy accumulator means. In such case it will be noted that the speed increases at a rate less than that where energy accumulators are not employed but at a rate substantially greater than a sinusoidal wave. In using an accumulator means between the piston and the agitator some of the energy of acceleration is absorbed in the accumulator means until the speed of the agitator lags slightly behind that of the piston and the vane piston reaches its maximum speed S at which time the energy absorbed in the rubber bushing 40 and the rubber blocks 45 is delivered back into the system and the agitator speed continues to increase until it reaches a maximum to when the energy absorbed in the rubber has been delivered back to the system the speed of the agitator drops to the speed of the vane piston 25 and then continues at this constant speed for the remainder of the half cycle. To prevent the maximum agitator speed from exceeding S, the maximum speed of the vane piston must be designed to be something less than S, e.g., U which in a preferred embodiment was approximately 77% of S as indicated by curve 54.

It will be noted that in all instances, the areas under the curves 50, 51 and 54 are substantially greater than the area under the sinusoidal curve 49 even though the maximum instantaneous speed is the same. The amount of energy delivered to the clothes is determined by the area under these curves. Using the present invention, it will be seen that substantially more amounts of energy can be delivered to the clothes for the same maximum speed.

The transmission F as described in the said copending application of Brundage has means for varying the output volume of the pump even though the pump is rotating at a constant speed. It will be appreciated that if desired, the shape of the speed versus time curve of the agitator E can be further varied by simultaneously varying the output of the pump during each half cycle.

Thus it will be seen that embodiments of the invention have been described wherein at least one half of the peak agitator velocity is obtained in less than the first $\frac{1}{15}$ of each half cycle and that the acceleration of the agitator at the beginning of each half cycle is at least 1½ times that of acceleration when the agitator velocity varies sinusoidally.

The present invention enables a greater amount of washing action for the same or a lesser maximum speed than heretofore obtainable.

The invention has been described with reference to preferred embodiments. Obviously modifications and alterations will occur to others upon a reading and understanding of this specification and it is may intention to include all such modifications and alterations insofar as they come within the scope of the appended claims.

Having thus described our invention, we claim:

1. A laundry machine having an agitator to be reciprocated or oscillated, a reversible, constant-displacement, hydraulic motor mechanically associated with said agitator, a constant displacement hydraulic pump supplying hydraulic fluid to said hydraulic motor, a substantially constant speed electric motor driving said pump, a valve means between said pump and said motor for reversing the direction of fluid flow in said hydraulic motor, said motor having, speed-time variation which is substantially a square wave; and, other means limiting the acceleration of said agitator when said hydraulical motor is reversed.

2. The combination of claim 1 wherein said other means include a pressure relief valve in the output of said pump.

3. The combination of claim 1 wherein said other means include an elastic torsional member between said hydraulic motor and said agitator.

4. The combination of claim 3 wherein said other means are in the form of a sleeve of rubber between the motor output shaft and said agitator.

5. The combination of claim 1 wherein said valve means is shifted from one position to the other by hydraulic pressure.

6. The combination of claim 1 wherein said other means include elastic supporting means for said hydraulic motor.

7. The combination of claim 1 wherein said other means includes a hydraulic accumulator connected to the output of said pump.

References Cited by the Examiner

UNITED STATES PATENTS

| | | | |
|---|---|---|---|
| 968,413 | 8/1910 | Raymond | 68—55 X |
| 977,772 | 12/1910 | Yassenoff | 68—137 |
| 1,932,246 | 10/1933 | Kirby | 28—26 |
| 2,025,840 | 12/1935 | Wright | 68—132 |
| 2,072,047 | 2/1937 | Kirby | 68—133 |
| 2,078,139 | 4/1937 | Hansen | 68—133 |
| 2,422,545 | 6/1947 | Hansen | 68—133 |
| 2,444,018 | 6/1948 | Deloghia | 68—133 |
| 2,574,418 | 11/1951 | Rubano | 68—23 X |
| 2,816,450 | 12/1957 | Conlee | 68—133 X |
| 3,242,703 | 3/1966 | Brundage | 68—133 X |

FOREIGN PATENTS

| | | |
|---|---|---|
| 248,274 | 2/1961 | Australia. |
| 429,644 | 6/1935 | Great Britain. |

WILLIAM I. PRICE, *Primary Examiner.*